United States Patent [19]
Kolibas

[11] 3,982,833
[45] Sept. 28, 1976

[54] COMPRESSED OPTICAL SYSTEM

[75] Inventor: James A. Kolibas, Broadview Heights, Ohio

[73] Assignee: Addressograph Multigraph Corporation, Cleveland, Ohio

[22] Filed: Aug. 15, 1975

[21] Appl. No.: 605,030

[52] U.S. Cl. .................... 355/11; 355/8; 355/51; 355/66
[51] Int. Cl.² .................................. G03G 15/00
[58] Field of Search ............ 355/11, 8, 45, 46, 49, 355/51, 65, 66

[56] References Cited
UNITED STATES PATENTS
3,580,675   5/1971   Hieber et al. ............... 355/51 X
3,703,335   11/1972   Hoffman et al. ............. 355/51

*Primary Examiner*—R. L. Moses

[57] ABSTRACT

An optical system, particularly for use in an electrostatic copier of the type in which a document is scanned as it moves through an object plane, and an image transmitted to a photoconductive element which is moving through an image plane. A plurality of optical systems each including a lens of short focal length and a roof mirror, are adapted to transmit a portion of an illuminated object plane along parallel light paths. The images thus transmitted are so oriented with respect to each other as to form an integrated image on a receiving surface located at an image plane. In one embodiment the receiving surface is in the nature of a transfer mechanism which has the image cast thereupon in wrong reading orientation, and which mechanically transfers the image, in right reading orientation, to a copy sheet. By introducing an additional plane mirror into the system, the image can be converted to a right reading image for projection directly on a moving copy sheet at an image plane.

4 Claims, 3 Drawing Figures

U.S. Patent  Sept. 28, 1976  3,982,833
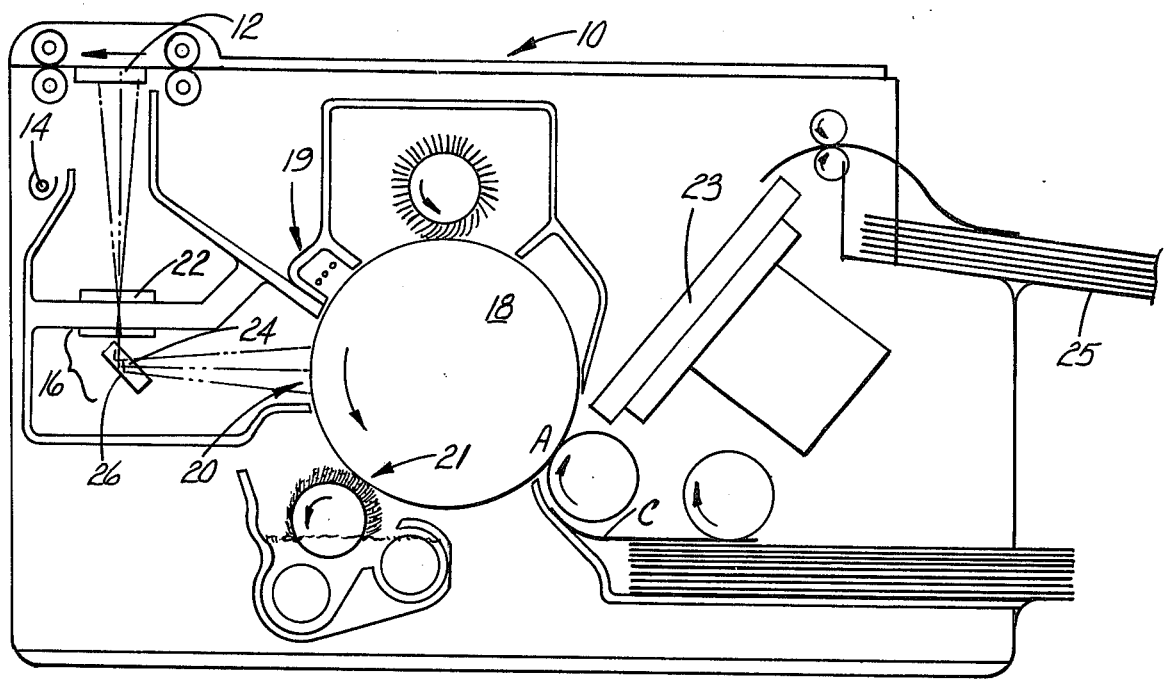
FIG. 1
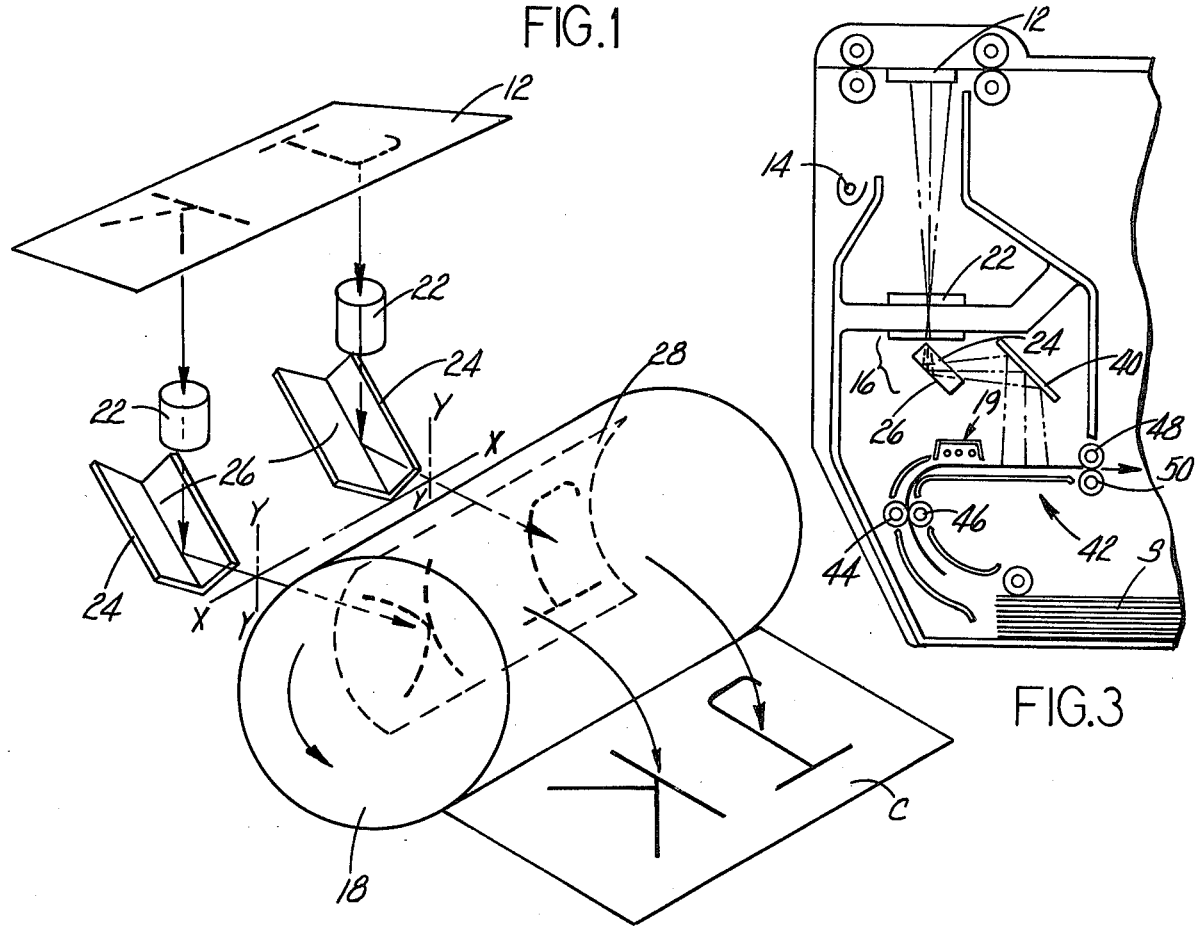
FIG. 3
FIG. 2

COMPRESSED OPTICAL SYSTEM

BACKGROUND OF THE INVENTION

The present invention relates to an optical system, and particularly to an optical system for use in an electrostatic copier of the type in which a document is scanned as it moves through an object plane, and an image transmitted to a photosensitive element which is moving through an image plane.

There is an existing need in the photocopying arts for image transmitting systems which clearly and accurately transmit an image, while minimizing the housing necessary for packaging the photocopying apparatus.

Optical systems which are typical of the prior art may be found in U.S. Pat. Nos. 3,605,593 (Anderson), 3,113,484 (Baker), 2,953,980 (Montebello), 2,736,235 (Toulon), 3,221,591 (Schepler), 3,447,438 (Kaufer et al) 2,573,242 (Bonnet), and British patents 1,200,383 and 26,820.

Optical systems in current use in connection with customary sheet sizes usually employ lenses whose focal lengths are five inches or more, and a focal length of this order represents a light path of about 20 inches or more.

Materially shortening this light path by means of a shorter focal length lens is not possible within the bounds of current technology, because the widest angle lenses which can be constructed in the shorter focal length range are not capable of spanning an ordinary sheet width such as 8½ inches.

SUMMARY OF THE PRESENT INVENTION

The present invention provides an exceedingly compact optical system for transferring an image from an object plane to an image plane. According to the invention, plural optical systems are provided using off-the-shelf optical devices including lenses of short focal lengths, which systems transpose a right reading original into an integrated image, either wrong reading or right reading, at a receiving surface located in an image plane.

The preferred embodiment of the present invention contemplates a plurality of simple lenses, preferably two, of short focal length. The lenses are adapted to transmit substantially discrete images of portions of the object plane along parallel light paths. Associated with each lens is an inclined roof mirror. The roof mirrors are adapted to transmit the image portions associated with their respective light paths, and to double reflect the images and thereby transmit an integrated image to a receiving means located in an image plane.

When the present invention is employed in an electrostatic copier the receiving means usually comprises a photoconductive transfer belt or drum located in an image plane directly in the path of the illumination reflected by the roof mirror. The transfer belt or drum receives the image in wrong reading orientation and delivers the image to a transferring location where it transfers the image to a copy sheet, at the same time, of course, inherently mechanically reversing it to a right reading orientation on the copy sheet.

In a second form of the invention, a plane mirror is added to the combined optical systems and the image is then formed in right reading orientation on the receiver, which in this case might be a photoconductive copy sheet.

While the preferred embodiment of this invention contemplates a compact optical system for use in an electrostatic copier, the principles of this invention are equally applicable to numerous comparable forms of image transmitting systems.

The other objects and advantages of this invention will become further apparent from the following specification and the accompanying drawings wherein:

FIG. 1 is a sectional view of an electrostatic copier employing the present invention;

FIG. 2 is a diagramatic perspective view of an optical system for transferring an image in accordance with the present invention.

FIG. 3 is a sectional view of the optical system similar to that shown in FIG. 1, but illustrating the creation by optical means of a right reading image.

DETAILED DESCRIPTION OF THE PREFERRED EMBODIMENT

As set forth above, the present invention relates to an image transmission system which, in its preferred embodiment, is particularly suitable for use in an electrostatic copier of the type in which a document is scanned as it moves through an object plane and its image transmitted to a photoconductive element moving simultaneously through an image plane. For the purposes of illustrating the present invention, the description which follows relates to the present invention as employed in such an electrostatic copier. However, from the description which follows, it is contemplated that numerous obvious applications of the present invention to comparable image transmission apparatus will become further apparent to those of ordinary skill in the art.

Referring now to FIG. 1, there is represented at 10 an electrostatic copier. The copier 10 is designed as a "desktop" type model, inasmuch as the optical system according to the present invention provides a compact enough optical system to be incorporated in such a model. Thus, the copier 10 is designed for use in a relatively small area, and the copier is specifically designed to simply rest on a desk or table top.

Briefly, the operation of the copier 10 begins with the moving of an original document through an illumination station along an object plane 12. The document is progressively illuminated by lamps 14 and the reflected light from the object plane is transmitted by means of an optical system 16 to a photoconductive element, shown in FIG. 1 as a transfer drum 18. The drum is so driven, in a well known manner, that its surface progresses in synchronism with the movement of the original document along the object plane 12.

The surface of the transfer drum 18 becomes photoconductive as it passes a charging station 19, and the charged photoconductive surface is moved through an exposure or image station 20 at which it is exposed to the image transmitted by the optical system. The charge on the photoconductive surface is dissipated in all but the areas which correspond to the image portions of the document as transmitted by the optical system. This leaves a charged image on the transfer drum 18. In the further operation of the copier the transfer drum 18 passes through a developing station 21 where the latent charge image is developed with toner powder in a known manner, and then rotates to a position A at which it contacts copy sheet C. The image is transferred to the copy sheet C, usually by impressing an electrical potential of appropriate aspect across the interface between the drum and the copy sheet at position A. The copy sheet C then passes to a fixing station 23 at which the image is fixed by means of heat, pressure, etc. The copy sheet is then delivered to a receiving tray 25.

According to the present invention, there is provided an improved optical system for transferring the reflected light from the object plane 12 to the photoconductive surface of transfer drum 18 as it is moved through the image area 20. Moreover, in a further aspect of the present invention, the combination of the optical system and an additional optical element provide a compact system for transmitting an image from an object plane to a receiving sheet located in an image plane.

The overall optical system, according to the present invention, comprises a series of individual optical systems, each including a lens of short focal length. As seen in FIG. 2, the preferred embodiment of the present invention contemplates two lenses 22, each of which receives reflected light from approximately one-half of the object plane 12. The lenses are designed to transmit their respective portions of the object plane along parallel light, or optic, paths. The images which are transmitted by these lenses form an image which is reversed relative to the document image which it sees and which is, therefore, referred to as wrong reading with respect to the document image.

For the usual electrostatic copier of the type which handles conventional 8½ × 11 inch documents, the preferred embodiment of the present invention contemplates a plurality of lenses, each of which has a focal length of less than 3 inches. By "short focal length" it is meant that the focal length is less than that focal length which the optical art fixes as a necessary minimum for spanning the width of the object area which it is desired to cover.

Heretofore, it has not been recognized as feasible to use lenses in parallel for generating an image for photocopying purposes, since the action of the individual lenses is to create individual images which are individually reversed and hence form a meaningless composite. I have discovered, however, that if plural short focal length lenses are combined in a particular way with corresponding roof mirrors, that it is, surprisingly, possible to bring about a usable integrated image, made up of the partial images of the original document. Therefore, associated with each of the lenses 22 is a roof mirror 24. Each roof mirror 24 has its apex 26 inclined with respect to the light path established by the lens system, and each roof mirror effects a double reflection of the image it receives from its respective lens. In the preferred embodiment, since there are a pair of lenses there are also a pair of roof mirrors, each associated with a respective lens. Also, the inclination of the apex of the roof mirror serves to divert the light transmitted through its lens along a path which is at a substantial angle to the light path established by the lens.

The inverted wrong reading, individual or partial, image which would normally be cast by each lens is doubly reflected by its roof mirror. This causes the partial real image to rotate 180° about the axis Y—Y so that it is cast on the receiver surface in a position which still remains wrong reading when viewed directly. However, as to the reflection effected by each roof mirror considered in the plane of their apices, there is no rotation of the image relative to the X—X axis, and as in any single reflection situation the resulting real image when viewed directly on the projection surface appears reversed (in this case inverted). Thus, the real partial image finally cast upon the receiver 18, when viewed by looking at the face of the receiver is, in each case, a wrong reading image which assumes a position corresponding to what would be an erect (non-inverted) position if the light path had not been bent by the mirror. This sequence has the surprising effect of reorienting the individual images into a meaningful composite, although wrong reading in orientation.

Thus, as seen by photoconductive surface of the transfer drum 18, the image 28 appearing upon the transfer drum is essentially an integrated upright wrong reading image. When the image is further transferred to the copy sheet this transformation serves to mechanically transform the received image into a right reading image as seen on the copy sheet.

It will be appreciated that the two or more optical systems 22, 24 are acting independently, and while they are intended to be parallel and spaced to provide completely merging images in practice their parallelism and spacing, as initially set up, may not be altogether precise. Accordingly, the lenses and mirrors may be equipped with conventional mounting devices providing for refined angular adjustment so that the images produced, where they overlap, can be readily brought into precise visual congruence.

In case it is desired that the light image be right reading instead of wrong reading, as is required, for example, when the copy paper itself carries the photoconductive layer rather than receiving the image material from a photoconductive transfer member, then the receiver, instead of being a device for mechanically reversing the image by transfer, will instead be an optical element, namely a plane mirror. FIG. 3 illustrates this arrangement wherein a plane mirror 40 bends the output rays from all of the roof mirrors 26 and causes them to focus at an imaging station 42. Copy paper C carrying its own photoconductive layer is separated from a supply stack S, one sheet at a time, and fed past a charging device 19' by transport rollers 44, 46, and thence through the imaging station 42 in synchronism with the original being fed through the illumination station 12, and finally is forwarded by other transport means such as rollers 48, 50 to suitable development and fixing means of conventional form. The already integrated but wrong reading image (corresponding to image 28 in FIG. 2) when reflected by the mirror 40 will evolve as an integrated right reading image formed upon the copy paper surface at imaging station 42. The balance of the optical system is the same as that shown in FIG. 1 and is, therefore, not discussed in detail, the parts being designated by the same numerals as those previously used.

Thus, the present invention essentially provides an optical system having a plurality of lenses of short focal length for first establishing a light path for light reflected from an object plane, and an equal number of roof mirrors designed to alter the path of the reflected image and to transmit the reflected image to a receiving surface. When the receiving surface is associated with a mechanical reversal device, the latter is designed to again reverse the image so that the resultant image transferred to a copy sheet is a right reading image. When the receiving surface is an optical reversal device, viz. a plane mirror, the image is projected thereby to a final receiving surface such as a copy sheet, in right reading orientation. With the foregoing disclosure in mind, various obvious modifications of this invention will become further apparent to those of ordinary skill in the art.

Therefore, what is claimed is:

1. In an electrostatic copier of the type having an illuminated object plane at which a moving document is scanned, and light reflected from the object plane is transmitted to a moving photoconductive transfer surface to produce an image of the document thereon and the transfer surface then transfers the image to a copy sheet, the improvement comprising a plurality of lenses of short focal length for receiving reflected light from respective portions of the object plane in parallel and for transmitting the reflected light along parallel light paths, a roof mirror associated with each of said lenses for altering the direction of the light path from the respective lens and for transmitting the reflected light to the photoconductive transfer surface in an integrated wrong reading orientation as cast upon the transfer surface.

2. An image transmission system comprising an object plane, illumination means for illuminating said object plane, a plurality of simple lenses of short focal length for receiving reflected light from respective portions of the object plane in parallel and for transmitting the reflected light therethrough, a roof mirror associated with each of said lenses for double reflecting the illumination transmitted through its respective lens and directing it at a predetermined angular orientation, a receiving surface located at an image plane for receiving an integrated image of said illuminated object plane.

3. An image transmission system as set forth in claim 2 wherein said receiving surface comprises a transfer surface located in an image plane which is directly in the path of the illumination diverted by said mirror, said transfer surface thereby having the image of said object plane cast upon it in an integrated wrong reading orientation.

4. An image transmission system as set forth in claim 2 wherein a plane mirror is located in the path of the illumination diverted by said roof mirror, said plane mirror being effective to further reflect the illumination and direct it to the image plane.

* * * * *